Jan. 25, 1966 A. L. HENLEY 3,230,788
ADJUSTABLE CIRCUMFERENCE PULLEY
Filed Aug. 15, 1963
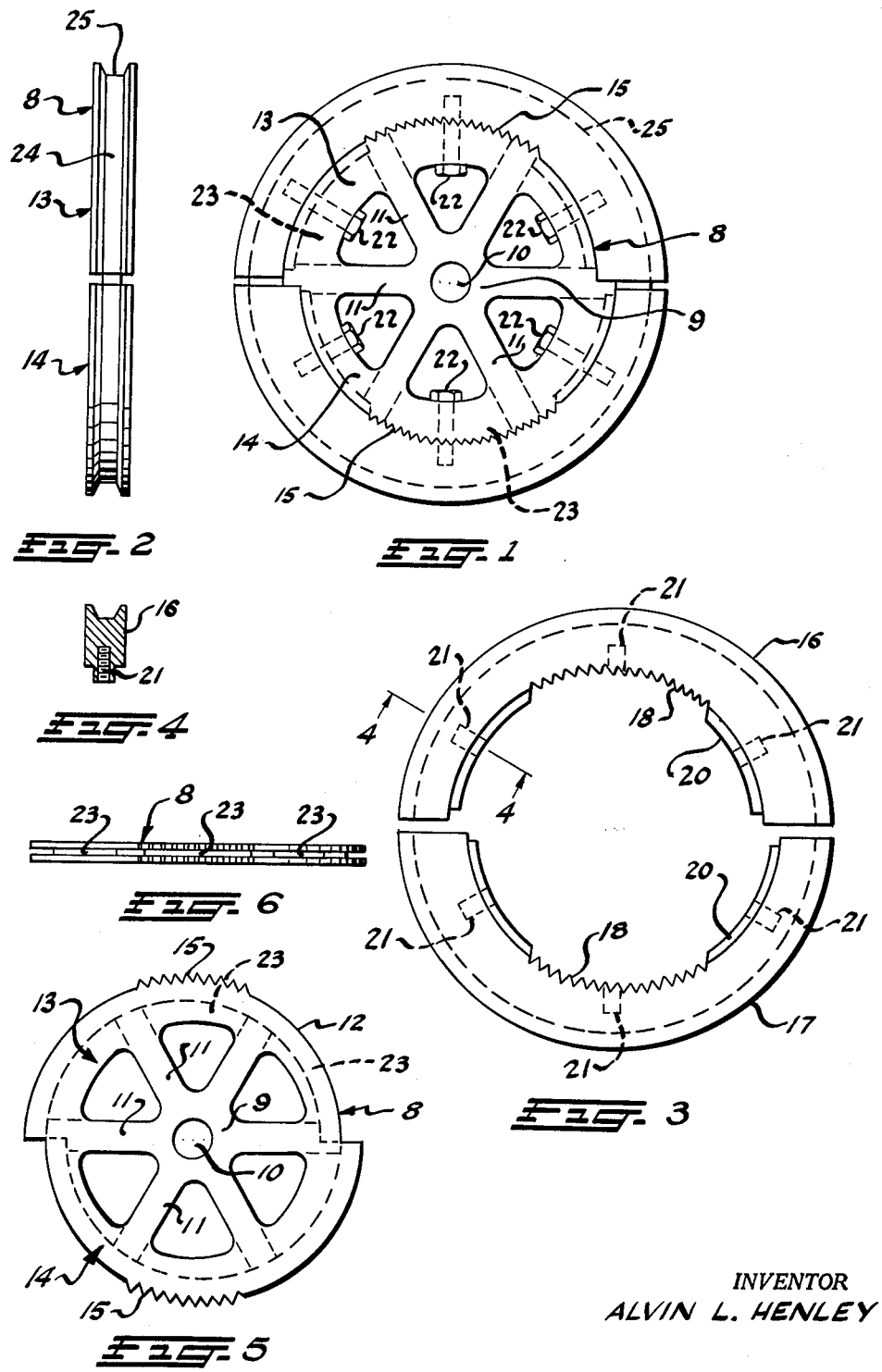
INVENTOR
ALVIN L. HENLEY

United States Patent Office 3,230,788
Patented Jan. 25, 1966

3,230,788
ADJUSTABLE CIRCUMFERENCE PULLEY
Alvin L. Henley, 5111 Beekman Road,
Houston 21, Tex.
Filed Aug. 15, 1963, Ser. No. 302,261
5 Claims. (Cl. 74—230.18)

This invention relates to machinery and, more particularly, to that piece of machinery known the world over as a pulley.

The pulley, as nearly every one in the art well knows, is a fixed circumference device over which a rope or the like is placed for the transmittal of rotary motion from the supporting shaft of one pulley to the supporting shaft of another pulley.

Since experimentation is sometimes unavoidable in mechanism involving the use of pulleys, as it is not always possible to predetermine the exact circumference of pulley one should use, the mechanic is faced with the rather expensive necessity of purchasing or borrowing two or more pulleys of different circumference until he knows exactly which one is best suited for the job at hand.

It is therefore the principal object of this invention to provide an adjustable circumference pulley that will do away with the necessity of having pulleys of different circumference on hand merely to find out exactly which one a person should use for a given installation.

Another object of this invention is to provide an adjustable circumference pulley that can be adjusted by any person having knowledge of machinery and who has the ordinary hand tools of this trade available.

Another object of this invention is to provide an adjustable circumference pulley having only three parts, other than its securement screws.

Another object of this invention is to provide an adjustable circumference pulley that has positive locking mechanism in the form of a plurality of mating V-shaped teeth as will be hereinafter described.

Still another object of this invention is to provide an adjustable circumference pulley that can be adapted to take any diameter rope or a V-belt of any dimension.

FIGURE 1 is a side view of this invention ready for use.

FIGURE 2 is an end view of this invention ready for use.

FIGURE 3 is a side view of the two outer rims of this invention.

FIGURE 4 is a cross-sectional view taken along line 4—4 of FIGURE 3 of this invention.

FIGURE 5 is a side view of the body of this invention.

FIGURE 6 is a top view of FIGURE 5 of this invention.

Referring more specifically to the drawing in the embodiment shown, an adjustable circumference pulley according to the invention comprises a body 8 that is basically circular when viewed from the side and which in this particular instant consists of a center portion 9 that is provided with an opening 10 through which a supporting shaft is placed, and a plurality of equally and radially spaced spokes 11 that have their outer end terminating in the peripheral member 12 having one half 13 offset, when viewed from the side, from the other half 14 with which it is integral. The periphery of each half 13 and 14 of the aforesaid peripheral member 12 is provided with a plurality of V-shaped teeth 15 as clearly shown in FIGURE 5 of the appended drawing.

Looking now at FIGURE 3 of the drawing, it will be seen that this invention consists of two outer rim portions 16 and 17 as well as the already described body 8. Each outer rim portion 16 and 17, which is provided with a plurality of V-shaped recesses 18 in the inner peripheral portion 20 as well as a plurality of equally and radially spaced tapped recesses 21 for the reception of the externally threaded end of a bolt 22 that is inserted in the elongated opening 23 between the aforesaid spokes 11 of the already mentioned body 8. The outer surfaces of the rim portions 16 and 17 are concentric, but the inner surfaces of these rims are eccentric the same as the corresponding halves of body 8 are eccentric. There is normally a small space between the ends of the rim portions to permit adjustment of these rims with respect to the body. The peripheral center 24 of each outer rim portion 16 and 17 is machined or otherwise has formed therein a groove 25 in which is placed the rope or belt that is used in connection with this invention when it is assembled in or on a piece of machinery. The groove shown in the present embodiment of this invention is shaped for a V-belt although it can, of course, be of any desired configuration.

It is clear from an examination of the drawing by anyone having either a knowledge of general mechanics, or knowledge and experience with machinery in the power transmission art, that one has only to take the three basic parts that go to make up this invention, namely the body 8 and the two rim portions 16 and 17 and assemble them together in the manner shown in FIGURE 1 where it is seen that the V-shaped teeth 15 on the periphery of the aforesaid body 8 are in engagement with the V-shaped recesses 18 in the outer rim portions 16 and 17 to which the body 8 is secured by means of the plurality of bolts 22. A slight rotation of the rim portions 16 and 17 in a counter-clockwise direction the second before they are placed in engagement with the body 8 will provide an adjustable pulley of an increased circumference, while a slight rotation of the same rims in a clockwise direction the second before they are placed in engagement with the aforesaid body 8 will provide a pulley having a decreased circumference. The tightening of the bolts 22 will firmly hold the three major parts of the pulley in the desired position without any danger of their slipping out of place by reason of the engagement of the teeth.

This invention can also be made in a slightly modified form whereby the teeth and their mating recesses are left off and out of the parts as they are machined and the locking is done entirely by the holding power of the bolts 22. While this form of the invention is admittedly cheaper to manufacture, it is not recommended in any installation where the torque on the pulley is high. This modified form of the invention is best adapted to machinery having little or no load on the pulleys, such as in model work or other similar installations.

Although not previously mentioned in any part of this specification, this novel invention of an adjustable circumference pulley can be used for measuring purposes. In fact, it may be desirable to graduate the two halves 13 and 14 of the peripheral member 12 at one of their meeting points though this feature of the invention is not shown in the drawing. An example of the use of this invention for measuring purposes is given as follows.

A pulley must maintain a given circumference for a given diameter of wire line or wire rope that contacts and rotates the pulley fixed on a shaft and the shaft, in turn, rotating, by connections, what is known as an odometer, thereby giving an accurate measurement in feet of the wire line traveling past the pulley. Also, as the pulley circumference wears smaller from the pressure of the wire line, the circumference of the pulley can be maintained by the eccentric adjustment.

This invention can, of course, be made of any desired material and/or combination of materials and in any diameter or width and still fall within the spirit and intent of the appended claims as will any other modification that can be made by any person skilled within the art even though the modification is not shown in the drawing.

In accordance with the provisions of the United States Patent Statutes, as given in the United States Code Title 35, Patents, what I now claim as new and desire to secure by Letters Patent is:

1. An adjustable circumference pulley of the character described, comprising a circular body having a centrally located opening through which is placed a supporting shaft, and a plurality of teeth on the upper and lower periphery of the said circular body, the said teeth being diametrically opposite one another, and a pair of outer rim portions having recesses adapted to receive the teeth of the said circular body when said outer rim portions are secured to the said circular body and the said outer rim portions each having their periphery formed to receive a belt.

2. An adjustable circumference pulley of the character described, comprising a circular body having a centrally located opening through which is placed a supporting shaft, and a plurality of teeth on the upper and lower periphery of the said circular body, the said teeth being diametrically opposite one another, and a pair of outer rim portions having recesses adapted to receive the teeth of the said circular body when the said outer rim portions are secured to the said circular body by a plurality of equally and radially spaced bolts, and the said outer rim portions each having their periphery formed to receive a belt.

3. An adjustable circumference pulley of the character described, comprising a circular body having a centrally located opening through which is placed a supporting shaft, and a plurality of V-shaped teeth on the upper and lower periphery of the said circular body, the said teeth being diametrically opposite one another, and a pair of outer rim portions having recesses adapted to receive the teeth of the said circular body when the said outer rim portions are secured to the said circular body by a plurality of equally and radially spaced bolts, and the said outer rim portions each having their periphery formed to receive a belt.

4. An adjustable circumference pulley of the character described, comprising a circular body having each half offset from the other half, and also having a centrally located opening through which is placed a supporting shaft, and a plurality of V-shaped teeth on the upper and lower periphery of the said circular body, the said teeth being diametrically opposite one another, and a pair of outer rim portions having recesses adapted to receive the teeth of the said circular body when the said outer rim portions are secured to the said circular body by a plurality of equally and radially spaced bolts, and the said outer rim portions each having their periphery formed to receive a belt, and the inner surfaces of the said rim portions being offset to the same extent as the corresponding halves of the said circular body are offset.

5. An adjustable circumference pulley of the character described, comprising a circular body having each half offset from the other half, and also having a centrally located opening through which is placed a supporting shaft, and a plurality of V-shaped teeth on the upper and lower periphery of the said circular body, the said teeth being diametrically opposite one another, and a pair of outer rim portions having recesses adapted to receive the teeth of the said circular body when the said outer rim portions are secured to the said circular body by a plurality of equally and radially spaced bolts, and the said outer rim portions each having their periphery formed to receive a belt, and the inner surfaces of the said rim portions being offset to the same extent as the corresponding halves of the said circular body are offset and each half of the said circular body having graduations thereon at their mating point, thereby providing a means of quickly adjusting the said pulley to a predetermined circumference without the use of measuring tools.

References Cited by the Examiner

UNITED STATES PATENTS

| | | | |
|---|---|---|---|
| 379,111 | 3/1888 | Haven et al. | 74—230.16 |
| 601,990 | 4/1898 | Suter | 74—244 |
| 994,896 | 6/1911 | Willson | 74—244 |
| 1,016,158 | 1/1912 | Karr | 74—230.18 |
| 1,204,555 | 11/1916 | Ferron | 74—244 |

DON A. WAITE, *Primary Examiner.*